(12) United States Patent
Liu et al.

(10) Patent No.: US 9,043,949 B2
(45) Date of Patent: Jun. 2, 2015

(54) SYSTEM AND METHOD OF CALIBRATING THE METER OF A PRODUCT DISTRIBUTION MACHINE

(75) Inventors: James Z. Liu, Belvidere, IL (US); Donald K. Landphair, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 109 days.

(21) Appl. No.: 13/619,076

(22) Filed: Sep. 14, 2012

(65) Prior Publication Data

US 2014/0076217 A1    Mar. 20, 2014

(51) Int. Cl.
| | |
|---|---|
| A01C 7/04 | (2006.01) |
| A01C 7/12 | (2006.01) |
| A01C 19/02 | (2006.01) |
| A01C 7/08 | (2006.01) |
| A01C 7/10 | (2006.01) |
| A01C 7/20 | (2006.01) |

(52) U.S. Cl.
CPC ............... *A01C 7/081* (2013.01); *A01C 7/082* (2013.01); *A01C 7/044* (2013.01); *A01C 7/105* (2013.01); *A01C 7/084* (2013.01); *A01C 7/125* (2013.01); *A01C 7/127* (2013.01); *A01C 19/02* (2013.01); *A01C 7/206* (2013.01); *A01C 7/107* (2013.01)

(58) Field of Classification Search
CPC ............ A01C 7/00; A01C 7/04; A01C 7/042; A01C 7/044; A01C 7/08; A01C 7/081; A01C 7/082; A01C 7/084; A01C 7/10; A01C 7/102; A01C 7/105; A01C 7/107; A01C 7/12; A01C 7/123; A01C 7/125; A01C 7/126; A01C 7/127; A01C 7/20; A01C 7/206; A01C 14/00; A01C 19/00; A01C 19/02; A01C 19/04; A01C 23/007; A01C 23/00
USPC ............ 701/50; 111/174, 176, 900, 177–179, 111/182, 200, 903, 921, 922
See application file for complete search history.

(56) References Cited

U.S. PATENT DOCUMENTS

| | | | |
|---|---|---|---|
| 4,480,466 A * | 11/1984 | Gates | ............................ 73/195 |
| 5,831,542 A | 11/1998 | Thomas et al. | |
| 5,996,516 A * | 12/1999 | Benneweis et al. | ........... 111/176 |
| 6,213,698 B1 | 4/2001 | Cosenza | |
| 2010/0264163 A1 | 10/2010 | Tevs et al. | |
| 2013/0319305 A1* | 12/2013 | Riffel | ........................ 111/130 |

* cited by examiner

*Primary Examiner* — Christopher J Novosad

(57) ABSTRACT

A system and method of calibrating a meter of a product distribution machine, such as an agricultural air seeder is shown. The system uses one or both of optical and mass flow sensors to measure the product flow rate. The sensors are used to measure mass flow rate during a calibration process while the machine is in use. To improve sensor accuracy during the calibration process, the meter speed is changed to change the product flow rate to a rate at which the sensor accuracy is increased.

13 Claims, 3 Drawing Sheets

SYSTEM AND METHOD OF CALIBRATING THE METER OF A PRODUCT DISTRIBUTION MACHINE

FIELD

The field relates to meter calibration of a product distribution machine such as an agricultural air seeder.

DETAILED DESCRIPTION

A product distribution device and method of distributing a product is provided and described below. One application of such a device and method is in an agricultural air seeder.

Figure 1:
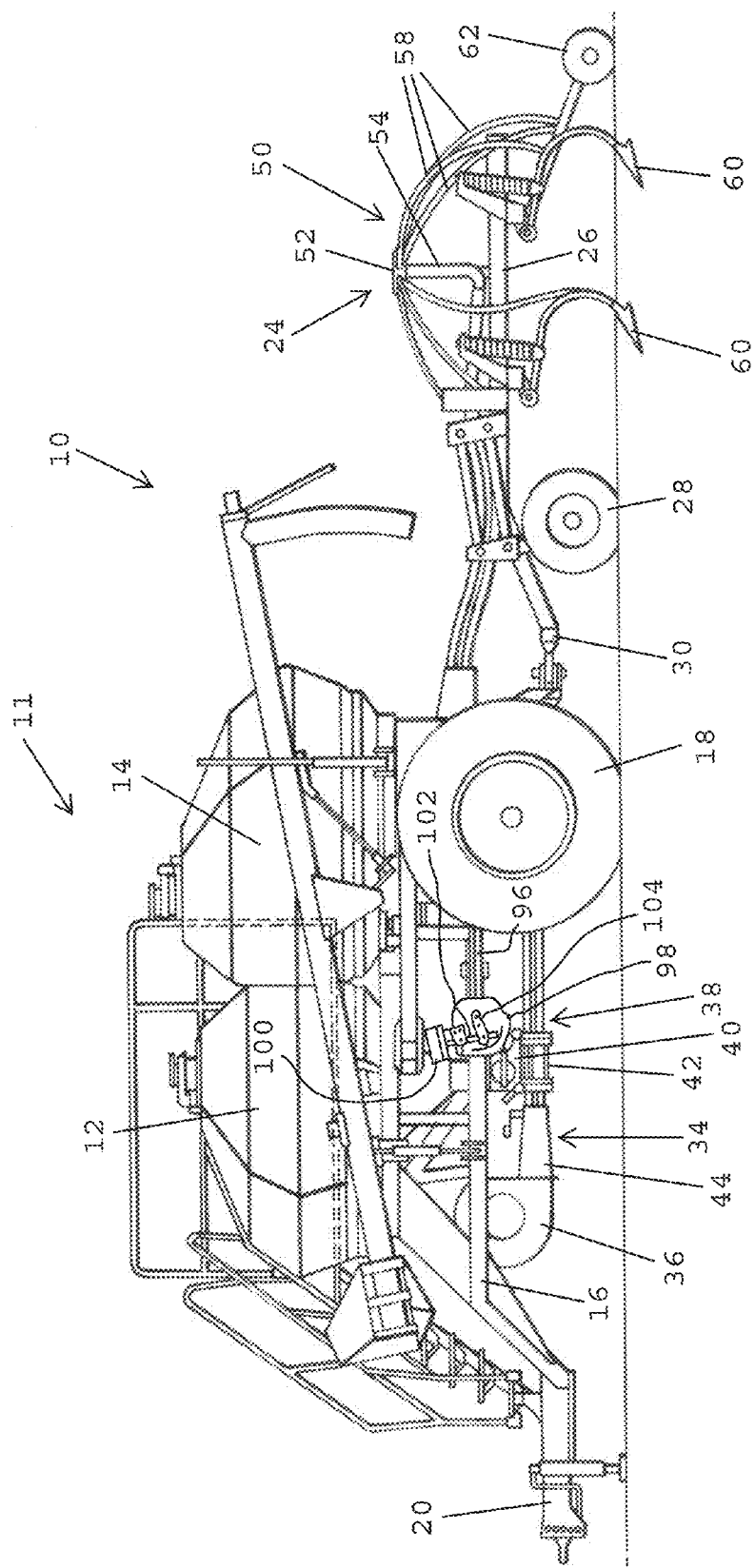
FIG. 1 is a side view of an agricultural air seeder.
Figure 2:
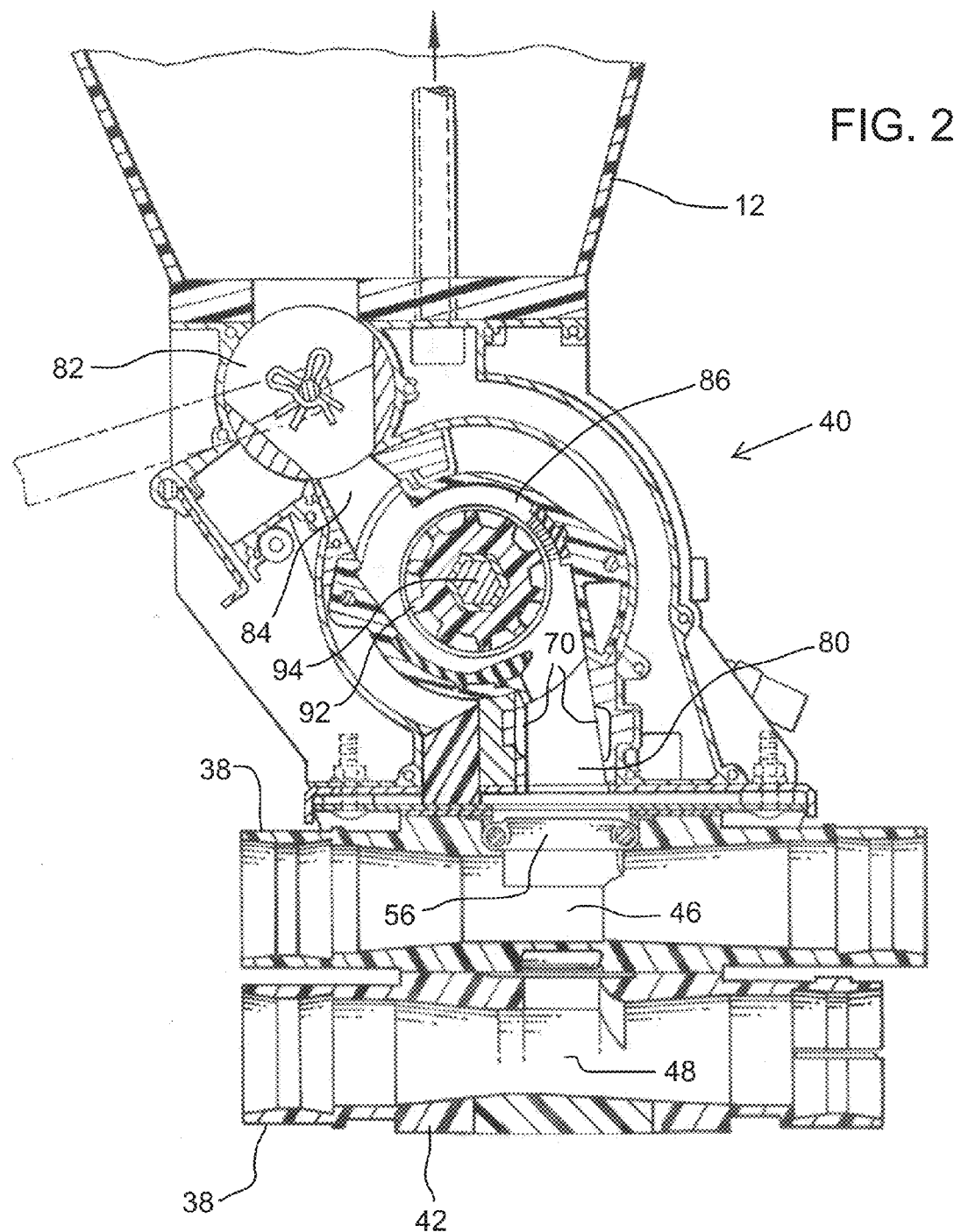
FIG. 2 is a sectional view of the meter and distribution manifold of the air seeder shown in FIG. 1.

Referring to FIG. 1 an agricultural seeding and fertilizing implement 10 commonly referred to as an air seeder is shown. Implement 10 includes and air cart 11 having containers or tanks 12 and 14 for containing products to be distributed to the soil. The tanks 12 and 14 are mounted on a frame 16 supported by ground wheels 18 for forward movement over the ground by a towing vehicle, such as an agricultural tractor 22 shown in FIG. 4, connected to a forward tongue 20. Any number of tanks can be provided on the air cart. A ground-engaging tool 24 includes a frame 26 supported by ground wheels 28 and connected to the rear of the air cart frame 16 by a tongue 30. Alternative arrangements may place the ground engaging implement in front of the air cart 11 or the air cart and the ground engaging tool can be combined onto a common frame. The tanks 12 and 14 can be any suitable device for holding the material to be dispensed. They could be, hoppers, bins, boxes, containers, etc. The term "tank" shall be broadly construed herein. Furthermore, one tank with multiple compartments can also be provided. The product contained in the product tanks 12 and 14 may include seed, fertilizer or other granular products.

An air distribution system 34 includes a fan 36 connected to a product delivery conduit structure having multiple product distribution conduits 38. The fan 36 directs air through the conduits 38. A product meter 40, located at the bottom of each tank 12 and 14, only one of which is shown in FIG. 1, delivers the products from the tanks 12 and 14 through cavities in the meter housing and in the distribution manifold 42 into the product delivery conduits 38. The particular type of meter is not important to the apparatus, however, in most instances, the meter will be a volumetric meter. An example of such a distribution system 34 is the John Deere 1910 Commodity Air Cart which is shown in detail in U.S. Pat. No. 6,213,598, incorporated herein by reference.

Each conduit 38 carries product rearwardly in the air stream to a secondary distribution tower 50. Typically, there will be one tower 50 for each conduit 38. Each tower 50 includes a secondary distributing manifold 52 located at the uppermost end of a vertical tube 54. The distributing manifold 52 divides the flow of product into a number of secondary distribution lines 58. Each secondary distribution line 58 delivers product to one of a plurality of openers 60 attached to the frame 26 at transversely spaced locations to deposit the product in the ground. A firming or closing wheel 62 associated with each opener 60 trails the opener and firms the soil over the product deposited in the soil. The implement 10 may be equipped with separate conduits 38 for each of the tanks 12 and 14 whereby different products can be distributed separately. Alternatively, the products from tanks 12 and 14 can be combined in the same conduits 38 for distribution together. In other embodiments of the distribution system, the conduits 38 may be selectively configurable to combine the products from tanks 12 and 14 into common conduits or to keep the products separate in different conduits 38.

An adjustable damper 44 in the air distribution system 34 directs the air stream to a top rank of conduits 38 and to a bottom rank of conduits 38. Typically both ranks of conduits would include multiple conduits for receiving metered product. The top rank of conduits 38 directs the top rank portion of the air stream into the top rank of venturis 46 in the primary air distribution manifold 42 associated with both product tanks. Similarly, the bottom rank of tubes 38 directs the air stream into a bottom rank of venturis 48 in the primary distribution manifold 42.

Product from tanks 12 and 14 is metered by the respective meters 40. The product enters the air stream through the venturis 45 or 48. The primary air distribution manifold 42 is provided with a selector valve 56 positioned between the product meter 40 and the venturis 46 and 48 for selectively directing metered product to either the top rank venturi 46 or the bottom rank venturi 48. For example, product in tank 12 may be directed to the top rank air stream, and product in tank 14 may be directed to the bottom rank air stream as dictated by the position of selector valve 56. Alternatively, the product from both tanks 12 and 14 can be directed into the top rank of conduits 38 and distributed together or both directed to the bottom rank of conduits 88 for distribution together.

Product from tank 12 is directed past shutoff valve 82 through inlet passage 84 into metering chamber 86 having a fluted metering roller 92 which is rotatably driven by hex shaft 94. The metered product is directed through outlet passage 80 to one of the venturis 46 or 48 depending upon the position of the selector valve 56. The outlet passages 80, the venturis 46 and 48, the conduits 38, the tower 54 and the secondary distribution lines 58 together constitute product flow passages through which the product flows downstream of the meter 40.

Optical mass flow sensors 70 may be located in outlet passage 80 for sensing the passage of product through these passages. The optical sensors 70 may also be placed in the conduits 38 or in the second distribution lines 58 or elsewhere in the product flow passages downstream of the meter. The optical sensors 70 may be of the type disclosed in U.S. Patent Application 2010-0264163 A1, incorporated herein by reference. The referenced sensor divides the cross sectional area of the product flow passage into multiple separated columns for sensing product flow in each column.

Figure 3:
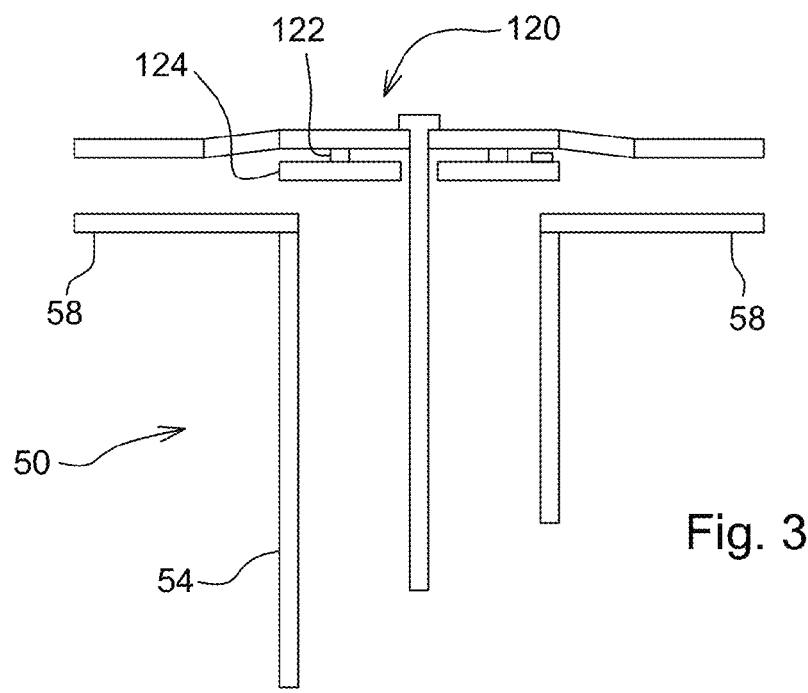
FIG. 3 is an upright sectional view of a secondary distribution tower of the air shown in FIG. 1.

An impact mass flow sensor 120, FIG. 3, can be deployed in the secondary distributing manifolds 52. The impact sensor 120 includes a washer type of load cell 122 connected to a larger washer-shaped impact plate 124 at the top of the upright tube 54. The diameter of the impact plate 124 is approximately equal to the diameter of the tube 54 so that substantially all the product delivered through the tube 54 impacts the plate 124 before exiting through the secondary distribution lines 58. Although the impact plate 124 is shown as flat, other surface shapes may also be used that can help to more evenly distribute the product to the lines 58. Impact mass flow sensors can be placed elsewhere in the air stream, before or after the seconday distribution manifold. For example, see U.S. Pat. No. 5,831,542, incorporated herein by reference, where an impact mass flow sensor is shown in the secondary lines.

The product meter 40 is driven by a mechanical ground drive system from the left rear wheel 18. A drive shaft 9$ is driven by the wheel through a commonly known chain drive (not shown). Shaft 96 is a drive input to an infinitely variable transmission 98. The transmission has a transverse output shaft that extends to the opposite side of the meter 40 and is coupled thereto by a chain. This drive is used on the 1910 Commodity Air Cart sold by John Deere. The output speed of the transmission 98 is varied by the electric motor 100. The motor 100 turns a screw 102 that moves a transmission adjustment lever 104. The ground drive results in the meter speed being proportional to the machine travel speed. The transmission 98 allows the meter speed to be adjusted to produce a desired product flow rate per unit area of ground covered. The mechanical ground drive system is relative simple and reliable. However, electric motor drives or hydraulic motor drives can be used as well to drive the meters and provide the needed speed adjustment to the meter to vary the product delivery rate.

Figure 4:
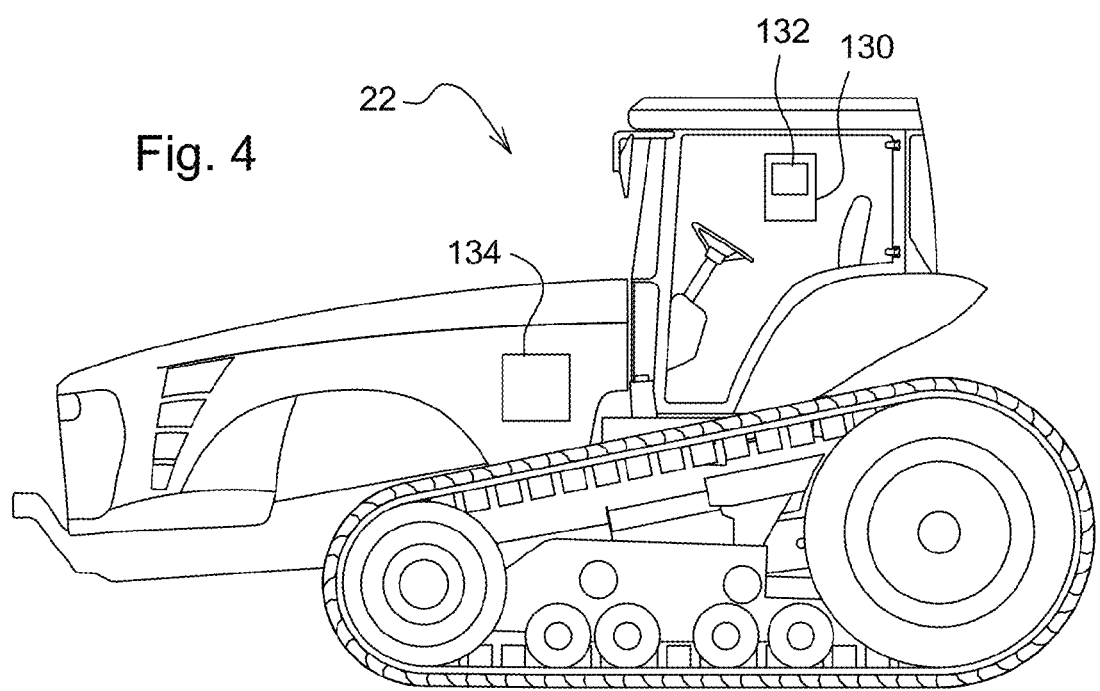
FIG. 4 is a side view of tractor for pulling the air seeder shown in FIG. 1.

The tractor 22 shown in FIG. 4 has a seeder monitor 130 mounted in die cab of the tractor. The monitor includes a display 132 for providing information to the operator. Also, the display 132 may be a touch screen to enable the operator to input data to the monitor for operation of the machine 10. Knobs and buttons may also be used to input data as well as transferable memory devices.

During operation of an air seeder, it is current practice to manually calibrate the meters. Meter calibration is done to determine the proper speed for rotating the meter to deliver the desired amount of product per unit area. Calibration is commonly done while the machine is stationery by turning the meter a given number of revolutions while capturing the product discharged from the meter. The captured product is they weighed and the mass of product per revolution of the meter is determined. From this, the proper setting of the variable speed transmission 98 is determined. Such a process is time consuming and represents non-productive time with the machine. As a result, calibration is not performed as often as it should to provide correct metering rates. Instead of calibrating the meter in a stationary process, the mass flow sensors 70 and/or 120 can be used to measure the product flow rate in real time. However, the sensors have limitations and may not be able to accurately measure the product flow rates in all conditions, that is, all types of materials and at all delivery rates. For example, the optical mass flow sensor 70 is more accurate at low flow rates than at higher flow rates. The sensor 70 has higher accuracy when the particle size and shape are more uniform. The impact sensor 120, on the other hand, is generally more accurate for higher mass flow rates.

A calibration process is provided in which the speed of the meter is varied from a nominal speed setting to change the flow rate of the product to a rate at which the accuracy of the mass flow sensor is increased. For example, when using the optical mass flow sensor 70, the meter may be slowed to reduce the flow rate and thereby increase the sensor accuracy. The mass flow per revolution is calculated and the desired speed ratio between the meter and the ground wheel 18 is determined. The motor 110 is then used to adjust the transmission as needed. It is desirable and perhaps necessary with the mechanical meter drive, to change the travel speed of the machine 10 when changing the meter speed. With an electric or hydraulic motor driven meter, the meter speed can be changed independent of the machine travel speed but it may be desirably to change the machine travel speed nonetheless so that the material dispensing rate in mass per area remains constant even though the meter speed is changed.

To change the machine travel speed, the monitor may indicate on the display, a desired machine speed. The operator then manually changes the tractor 22 travel speed to the desired machine speed. Alternatively, the monitor 130 may be connected to the tractor speed controller 134 to directly send a speed change command signal to the controller 134 to change the tractor speed.

It is most likely that when using the optical sensor 70, it will be desired to reduce the meter and machine travel speeds when calibrating the meter. With the impact mass flow sensor, it is likely that the meter speed and the machine travel speed will be increased to increase the sensor accuracy. Although this is a general rule, there may be times when the opposite is true depending on the material being dispensed and the desired rate.

A given machine may have only one of the optical or impact sensors or it may be equipped with both types of sensors. Having both types of sensors is complementary and allows flexibility in calibrating. For example, a meter for a tank with seed may be best calibrated using the optical sensor while another tank may have fertilizer and the meter used at a high rate such that the meter is best calibrated using the impact mass flow sensor. In such a case, each meter 40 will be calibrated separately. The machine travel speed and meter speed will be reduced to calibrate the meter on the tank with the seed while the machine travel speed and meter speed may be increased to calibrate the meter on the tank with the fertilizer.

Having multiple sensor types in each product flow passage can also be used for increased accuracy in measuring the product flow rates even without changing the meter speed. In one scenario, one tank is filled with seed and the other tank is filled with fertilizer. Each product is distributed in separate conduits 38, for example, the see in the upper rank of conduits 38 and the fertilizer in the lower rank of conduits in what is now as a "double-shoot" distribution. Real time measurements of product flow can be done with the seed mass flow rate measured by the optical sensor and the fertilizer mass flow rate measured by the impact sensor.

In a "single-shoot" distribution, only one rank of conduits 38 is used, (or the machine is only equipped with one rank of conduits 38) and the seed and fertilizer is combined. The optical sensor may be the most accurate for the seed mass flow rate. The impact sensor is used to measure the combined mass flow rate. The fertilizer mass flow rate is then determined by subtracting the seed mass flow rate from the total mass flow rate.

With the single-shoot distribution, using multiple sensors allows for continued operation when one sensor has failed. For example, if the mass flow rate from each tank is measured by the optical sensors and the sensors for one tank fails, the flow rate can still be determined by using the total flow rate as measured by the impact sensor and subtracting the mass flow as measured from the functioning sensor.

Having two sensors in the product flow passage enables the machine to still operate and measure flow rates if one sensor fails. For example, if the impact sensor fails, the optical sensor can be used to measure the mass flow rate. While it may not be as accurate at the given mass flow rate as the impact sensor, it will still provide useful mass flow rate information to the monitor. Using two sensors of differing types as described allows for use of the most accurate of the two sensors. However, redundancy is provided if two sensors of the same type are used in a given product flow passage.

Having described the preferred embodiment, it will become apparent that various modifications can be made without departing from the scope of the invention as defined in the accompanying claims.

What is claimed is:

1. A product distribution machine for movement over the ground comprising:
    a tank adapted to hold a product to be distributed;
    a meter for controlling discharge of product from the tank;
    a product flow passage through which product flows downstream of the meter;
    a mass flow sensor adapted to measure product flow rate through the product flow passage, the mass flow sensor generating an output signal indicative of the flow rate of product past the mass flow sensor;
    a meter drive having variable speed; and
    a controller to control the speed of the meter drive and to change the speed of the meter drive during a meter calibration process from a first meter speed to a second meter speed where at the second meter speed the accuracy of the mass flow sensor is greater than at the first meter speed.

2. The product distribution machine of claim 1 wherein the controller generates a signal to change a travel speed of the product distribution machine to correspond with the second meter speed during the meter calibration process.

3. The product distribution machine of claim 2 wherein the signal to change the product distribution machine travel speed is a visual signal to an operator to manually change the product distribution machine travel speed.

4. The product distribution machine of claim 2 wherein the signal to change the product distribution machine travel speed is an electronic signal to a travel speed controller of a towing vehicle.

5. The product distribution machine of claim 1 wherein the mass flow sensor is an optical sensor.

6. The product distribution machine of claim 1 wherein the mass flow sensor is an impact sensor.

7. The product distribution machine of claim 1 having both optical and impact mass flow sensors in a single product flow passage.

8. A product distribution machine for movement over the ground comprising:
    a tank to hold a product to be distributed;
    a meter for controlling discharge of product from the tank;
    at least one product flow passage through which product flows downstream of the meter;
    at least two mass flow sensors adapted to measure product flow rate through the at least one product flow passage, each mass flow sensor generating an output signal indicative of the flow rate of product past each mass flow sensor; and
    a monitor receiving output signals from the at least two mass flow sensors, the monitor utilizing the output signal of whichever of the at least two mass flow sensors has the greatest accuracy for the product flow rate being measured at a given time.

9. The product distribution machine of claim 8 wherein the at least two mass flow sensors in the at least one product flow passage are of two different sensor types.

10. The product distribution machine of claim 8 wherein one of the at least two mass flow sensors is an optical mass flow sensor and the other is an impact mass flow sensor.

11. A method of calibrating a meter of a product distribution machine, the product distribution machine having a tank to hold a product to be distributed, the meter for controlling discharge of product from the tank, a product flow passage through which product flows downstream of the meter, a mass flow sensor to measure product flow rate through the product flow passage, the mass flow sensor generating an output signal indicative of the flow rate of product past the mass flow sensor, a meter drive having variable speed, and a controller to control the speed of the meter drive, the method comprising the steps of:
    operating the product distribution machine by moving the product distribution machine over the ground at a machine travel speed while operating the meter drive at a first meter speed;
    changing the meter drive speed to a second meter speed;
    while operating the meter drive at the second meter speed, measuring the product flow rate through the product flow passage;
    calculating a mass flow rate per revolution of the meter;
    operating the meter drive at a third meter speed determined from the calculated mass flow rate per revolution of the meter and the product distribution machine travel speed to produce a desired flow rate per area covered by the product distribution machine.

12. The method of claim 11 wherein the second meter speed is a speed at which the mass flow rate is in a range of greater sensor accuracy than the mass flow rate at the first meter speed.

13. A product distribution machine adapted to perform the method of claim 11.

* * * * *